(12) United States Patent
Capasso et al.

(10) Patent No.: US 12,703,496 B2
(45) Date of Patent: Aug. 11, 2026

(54) SUSPENSION ASSEMBLY FOR A TURBINE ENGINE

(71) Applicant: SAFRAN AIRCRAFT ENGINES, Paris (FR)

(72) Inventors: Valerio Capasso, Moissy-Cramayel (FR); Guillaume Glemarec, Moissy-Cramayel (FR); Jean-Baptiste Manuel Nicolas Vignes, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 48 days.

(21) Appl. No.: 18/851,947

(22) PCT Filed: Mar. 27, 2023

(86) PCT No.: PCT/FR2023/050429
§ 371 (c)(1),
(2) Date: Sep. 27, 2024

(87) PCT Pub. No.: WO2023/187284
PCT Pub. Date: Oct. 5, 2023

(65) Prior Publication Data

US 2025/0206448 A1 Jun. 26, 2025

(30) Foreign Application Priority Data

Mar. 28, 2022 (FR) ........................................ 2202724

(51) Int. Cl.
*B64D 27/40* (2024.01)
*B64D 27/12* (2006.01)

(52) U.S. Cl.
CPC .......... *B64D 27/404* (2024.01); *B64D 27/12* (2013.01); *B64D 27/40* (2024.01)

(58) Field of Classification Search
CPC ....... B64D 27/404; B64D 27/40; B64D 27/12
(Continued)

(56) References Cited

U.S. PATENT DOCUMENTS 9,573,694 B2 * 2/2017 Cassagne ............. B64D 27/404
11,333,293 B2 * 5/2022 Zwier .................. F16M 13/027
(Continued)

FOREIGN PATENT DOCUMENTS

FR 2 867 155 A1 9/2005
FR 3 021 298 A1 11/2015
(Continued)

OTHER PUBLICATIONS

France Search Report and Written Opinion mailed Nov. 8, 2022, issued in Application No. FR2202724, filed Mar. 28, 2022, 2 pages.
(Continued)

*Primary Examiner* — Todd M Epps
(74) *Attorney, Agent, or Firm* — CHRISTENSEN O'CONNOR JOHNSON KINDNESS PLLC

(57) ABSTRACT

A suspension assembly for a turbine engine includes a beam that attaches to an aircraft pylon. The beam has first and second portions, each carrying a half-housing together defining a ball joint housing. A ball joint nut is hingedly engaged to rotate in the ball joint housing, and a cylindrical part is configured to be attached to a fixed portion of the turbine engine, hinged in the ball joint housing, and mounted so as to be pivotable about its axis in the ball joint nut. The suspension assembly further includes a support ring surrounding the two half-housings around their entire circumference. The support ring performs a safety function in the event of failure of at least one element of the suspension assembly.

9 Claims, 5 Drawing Sheets

(58) Field of Classification Search
USPC ................................ 248/100, 554, 610, 317
See application file for complete search history.

(56) References Cited

U.S. PATENT DOCUMENTS

| | | | | |
|---|---|---|---|---|
| 12,246,845 | B2 * | 3/2025 | Cline | B64D 27/406 |
| 12,296,967 | B2 * | 5/2025 | Glemarec | F16F 15/04 |
| 12,404,821 | B2 * | 9/2025 | Glemarec | B64D 27/02 |
| 12,459,657 | B2 * | 11/2025 | Glemarec | B64D 27/404 |
| 2021/0380265 | A1 * | 12/2021 | Garnaud | B64D 27/16 |
| 2025/0215830 | A1 * | 7/2025 | Glemarec | F02K 3/077 |

FOREIGN PATENT DOCUMENTS

| | | | |
|---|---|---|---|
| WO | 2008/074063 | A1 | 6/2008 |
| WO | 2020/074811 | A1 | 4/2020 |

OTHER PUBLICATIONS

International Search Report mailed Jun. 23, 2023, issued in corresponding International Application No. PCT/FR2023/050429, filed Mar. 27, 2023, 6 pages.

Written Opinion mailed Jun. 23, 2023, issued in corresponding International Application No. PCT/FR2023/050429, filed Mar. 27, 2023, 5 pages.

* cited by examiner

SUSPENSION ASSEMBLY FOR A TURBINE ENGINE

FIELD OF THE DISCLOSURE

This invention relates to a suspension assembly for a turbine engine, in particular for a turbofan engine.

BACKGROUND

A turbofan engine conventionally comprises an annular flow path for a primary air flow, or primary annular flow path, which comprises, from upstream to downstream in the direction in which the gas flow circulates within the turbine engine, a low-pressure compressor, a high-pressure compressor, a combustion chamber, a high-pressure turbine, and a low-pressure turbine. The turbofan engine also comprises an annular flow path for a secondary air flow, or secondary annular flow path, externally surrounding the primary annular flow path. The primary and secondary annular flow paths are coaxial, the secondary annular flow path being arranged radially outside the primary air flow path. The terms radial and axial are defined relative to the axis of the turbine engine. The terms upstream and downstream are defined relative to the direction of circulation of the gas flows within the turbine engine.

The turbofan engine is generally attached to a pylon or strut of an aircraft, the pylon itself being attached to the structure of the aircraft, for example to the wing. The pylon allows the forces generated by the turbofan engine to be transmitted to the structure of the aircraft and also enables the routing of fuel, air, and electrical and hydraulic systems between the turbofan engine and the aircraft.

Patent application FR 2,867,155 in the name of the Applicant discloses a turbine engine attached to a pylon by means of a suspension assembly comprising an upstream suspension assembly and a downstream suspension assembly. The upstream suspension assembly is attached to an intermediate casing secured to a fan casing, the downstream suspension assembly being attached to an exhaust casing. The two casings are structural elements of the turbine engine.

The function of the suspension devices is to ensure the transmission of mechanical forces between the turbine engine and the pylon. In particular, these forces are the thrust generated by the turbine engine and oriented along the turbine engine axis, as well as the lateral aerodynamic loads and the weight of the turbine engine.

In the remainder of the description, we will focus in particular on the upstream suspension assembly.

Such a known upstream suspension assembly conventionally comprises a beam intended to be fixed to a pylon of an aircraft, a cylindrical part hinged in a ball joint housing, the ball joint housing comprising a body and a ball joint nut hinged in the body, the cylindrical part being mounted so as to be pivotable about its axis in the ball joint nut. The body of the ball joint housing is attached to a fixed portion of the turbofan engine, for example an intermediate casing or an inter-compressor casing, located between the low-pressure compressor and the high-pressure compressor of the primary flow path.

Due to the significant forces transmitted by the suspension assembly, the scenario must be considered where an element of this assembly breaks, while ruling out the possibility of the turbofan engine separating from the rest of the aircraft. For this purpose, the suspension assembly may comprise an additional or reserve force path designed to support a residual level of load, or limit load, when an element of the suspension assembly breaks.

A need currently also exists for limiting the dimensions of turbine engines while accommodating a significant number of devices. In order to be able to meet these various constraints, it is also necessary to reduce the bulk of the suspension devices.

There is also a need to improve the suspension devices, for a turbine engine which is shrouded or unshrouded.

SUMMARY

A suspension assembly for a turbine engine is thus proposed, comprising:

- a beam for the attachment thereof to an aircraft pylon, the beam comprising a first portion and a second portion each carrying a half-housing which together define a ball joint housing,
- a ball joint nut hingedly engaged to rotate in the ball joint housing, and
- a cylindrical part intended to be attached to a fixed portion of the turbine engine, hinged in the ball joint housing and mounted so as to be pivotable about its axis in the ball joint nut, wherein
- the suspension assembly further comprises a support ring surrounding the two half-housings around their entire circumference, the support ring being provided to perform a safety function in the event of failure of at least one element of the suspension assembly.

Furthermore, the beam may extend axially and the two portions and the two halves are symmetrical to each other with a respect to (i.e. according to) a radial plane and are secured to each other by fastening elements arranged on the beam.

Furthermore, the support ring may comprise two ring portions which are symmetrical to each other and bear against each other via ring flanges, the ring flanges being provided for fastening the two ring portions together.

The two ring portions may further be symmetrical to each other according to the radial plane, the ring flanges being arranged radially internally and radially externally, and each half-housing comprises ball joint housing flanges arranged radially internally and externally, the ring flanges and the ball joint housing flanges being provided for their joint attachment.

Alternatively, the suspension assembly may comprise a retaining ring and the ball joint housing may be cylindrical and without fastening elements, the retaining ring being arranged on the outer circumference of the ball joint housing, and the support ring being arranged on the outer circumference of the retaining ring, the two ring portions of the support ring being symmetrical to each other according to an axial plane perpendicular to the radial plane, the ring flanges of the two ring portions extending axially in an axial direction.

Furthermore, a ball joint ring may be arranged against the inner circumference of the ball joint housing, the ball joint nut being arranged in the ball joint ring. A vibration damping means may also be arranged radially between the ball joint ring and the inner circumference of the ball joint housing.

In addition, the cylindrical part may comprise a first half-cylinder and a second half-cylinder which are arranged circumferentially end to end, and the first half-cylinder comprises a first half-cylinder flange extending radially to the first half-cylinder and the second half-cylinder comprises a second half-cylinder flange extending radially to the second half-cylinder, the first half-cylinder flange and the second half-cylinder flange respectively comprising a first attachment means and a second attachment means for the independent attachment of each half-cylinder to the fixed portion of the turbine engine.

According to another aspect, a suspension assembly for a turbine engine is proposed, comprising:

- a beam for the attachment thereof to an aircraft pylon, the beam comprising a first portion and a second portion each carrying a half-housing which together define a ball joint housing,
- a ball joint nut hingedly engaged to rotate in the ball joint housing, and
- a cylindrical part intended to be attached to a fixed portion of the turbine engine, hinged in the ball joint housing and mounted so as to be pivotable about its axis in the ball joint nut, the cylindrical part comprising a first half-cylinder and a second half-cylinder which are arranged end-to-end circumferentially.

In the event of failure of a portion of the cylindrical part, and therefore of a half-cylinder, the faulty portion no longer allows correctly ensuring its connection to the fixed portion of the turbine engine. By separating the cylinder into two parts, this avoids transmitting the failure to the entire cylinder, and thus all the functional qualities of at least a portion of the cylindrical part, fixed to the turbine engine, are preserved. The connection with the turbine engine is thus still ensured despite the failure.

In addition, the first half-cylinder may comprise a first half-cylinder flange extending radially to the first half-cylinder and the second half-cylinder may comprise a second half-cylinder flange extending radially to the second half-cylinder, the first half-cylinder flange and the second half-cylinder flange respectively comprising a first attachment means and a second attachment means for the independent attachment of each half-cylinder to the fixed portion of the turbine engine.

This independent attachment allows keeping the two half-cylinders independent of each other so that a crack appearing in one of the half-cylinders is not propagated to the fixed portion of the turbine engine.

The beam may also extend axially and the two parts and the two half-housings may be symmetrical to each other with respect to a radial plane and be secured to each other by fastening elements arranged on the beam.

Furthermore, as each half-housing is cylindrical, the suspension assembly may also comprise a support ring surrounding the two half-housings around their entire circumference, the support ring being provided to perform a safety function in the event of failure of at least one element of the suspension assembly.

In addition, the support ring may comprise two ring portions which are symmetrical to each other and bear against each other via ring flanges, the ring flanges being provided for attaching the two ring portions together.

Also, the two ring portions may be symmetrical to each other according to the radial plane, the ring flanges being arranged radially internally and radially externally, and each half-housing may comprise ball joint housing flanges arranged radially internally and externally, the ring flanges and the ball joint housing flanges being provided for their joint attachment.

Alternatively, the suspension assembly may further comprise a retaining ring and the ball joint housing may be cylindrical and without any fastening elements, the retaining ring being arranged on the outer circumference of the ball joint housing, and the support ring being arranged on the outer circumference of the retaining ring, the two ring portions of the support ring being symmetrical to each other according to an axial plane perpendicular to the radial plane, the ring flanges of the two ring portions extending axially in an axial direction.

Furthermore, a ball joint ring may be arranged against the inner circumference of the ball joint housing, the ball joint nut being arranged in the ball joint ring. A vibration damping means may also be arranged radially between the ball joint ring and the inner circumference of the ball joint housing.

According to yet another aspect, an aircraft assembly is proposed comprising a pylon and a turbine engine, the turbine engine comprising a fixed portion, the aircraft assembly further comprising a suspension assembly as described above.

DESCRIPTION OF THE DRAWINGS

Other features, details and advantages will become apparent from reading the detailed description below, and from analyzing the attached drawings, in which.

DETAILED DESCRIPTION

Figure 1:
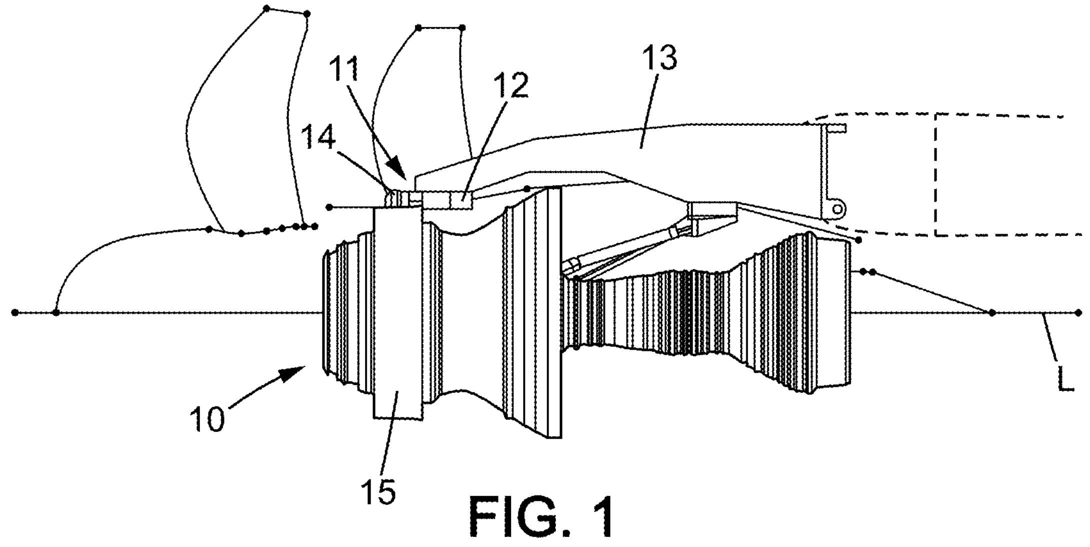
FIG. 1 is an overall view of a turbine engine attached to an aircraft pylon by means of a suspension assembly.

FIG. 1 illustrates an overall view of a turbine engine 10 on which a suspension assembly 11 is arranged. Suspension assembly 11 comprises a beam 12 fixed to an aircraft pylon 13, and a cylindrical part 14 fixed to a fixed portion 15 of turbine engine 10.

In the remainder of the description, the terms radial and axial are defined relative to the axis of the turbine engine, denoted L in FIG. 1.

FIGS. 2A, 2B, 3A, 3B, 4A and 4B illustrate different exemplary embodiments of suspension assembly 11. In these examples, suspension assembly 11 comprises in particular a beam 12, a ball joint 16, and a cylindrical part 14. The suspension assembly extends mainly in an axial direction, extending along the axis denoted X in the figures, from cylindrical part 14, upstream, to beam 12, downstream.

Beam 12 comprises a first portion 12*a* and a second portion 12*b*. First portion 12*a* and second portion 12*b* are symmetrical to each other according to a radial plane of symmetry passing through the axes denoted X and Z. Each first portion 12*a* and second portion 12*b* comprises an upper surface, respectively 13*a* and 13*b*, which may be substantially planar. Upper surfaces 13*a*, 13*b* are provided for attaching beam 12 to an aircraft pylon 13. Beam 12 thus allows attaching suspension assembly 11 to the aircraft, this attachment being divided into two portions. Thus, if a failure of one portion of beam 12 is observed, such as the propagation of cracks or fissures for example, then the other portion of the beam is not impacted by this failure. The beam is therefore separated into two portions so that at least one portion of the beam remains intact in the event of failure of the other portion of the beam.

Furthermore, first portion 12*a* and second portion 12*b* are secured to each other by fastening elements 50. Fastening elements 50 are for example screw-nut assemblies, the screws passing through first portion 12*a* and second portion 12*b* in a direction which follows the axis denoted Y, perpendicular to the radial plane of symmetry.

Each first portion 12*a* and second portion 12*b* respectively also comprises a first half-housing 16*a* and a second half-housing 16*b*. Each half-housing 16*a*, 16*b* is semi-cylindrical, the two half-housings being in edge-to-edge contact with each other and together defining a cylinder, this cylinder being a ball joint housing 17 comprising an inner circumference 18. Ball joint housing 17 receives ball joint nut 16. More precisely, suspension assembly 11 may further comprise a ball joint ring 19. Ball joint ring 19 is arranged against inner circumference 18 of ball joint housing 17. Ball joint nut 16 is arranged in ball joint ring 19. The ball joint nut may be defined as a spherical part comprising a bore passing through the sphere from one side of the X axis to the other.

Figure 5:
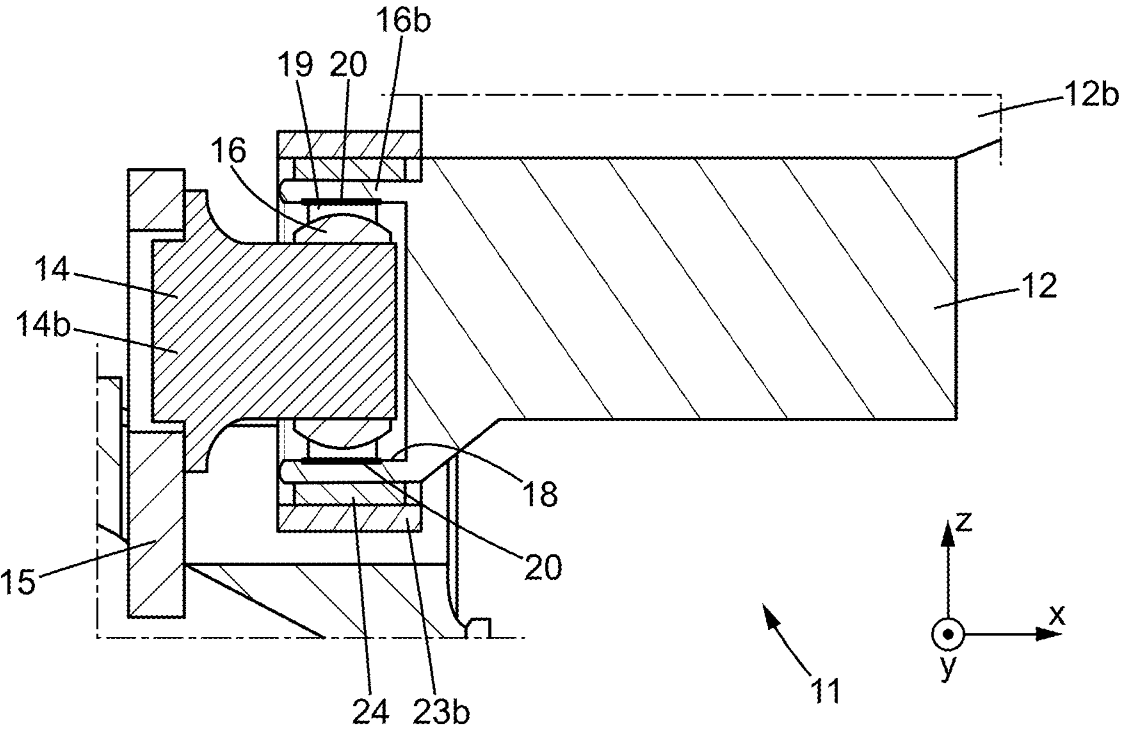
FIG. 5 is a section view along a radial plane, of an alternative embodiment of the suspension assembly.

According to an alternative embodiment, as illustrated in FIG. 5, suspension assembly 11 may further comprise a vibration damping means 20. Vibration damping means 20 may be arranged radially between ball joint ring 19 and inner circumference 18 of ball joint housing 17. In other words, the vibration damping means may be interposed between ball joint housing 17 and ball joint ring 19. Vibration damping means 20 allows limiting vibrations and their consequences, in structural and acoustic terms. It is characterized by its high elasticity and high capacity for deformation. Vibration damping means 20 is for example an annular flexible element of the elastomer type. Vibration damping means 20 reduces the vibrations transmitted from the turbine engine to the aircraft pylon.

Suspension assembly 11 further comprises a cylindrical part 14. Cylindrical part 14 is attached to fixed portion 15 of turbine engine 10. Cylindrical part 14 thus allows attaching suspension assembly 11 to turbine engine 10. Cylindrical part 14 is arranged at least in part within ball joint nut 16, and more precisely in its bore. In particular, cylindrical part 14 is mounted so as to pivot about axis X, within ball joint nut 16. Furthermore, cylindrical part 14 comprises a first half-cylinder 14*a* and a second half-cylinder 14*b*. First half-cylinder 14*a* and second half-cylinder 14*b* are arranged end-to-end circumferentially. More specifically, in accordance with the figures, first half-cylinder 14*a* and second half-cylinder 14*b* may be symmetrical to each other according to a radial plane of symmetry passing through the X axis and the Z axis. Alternatively, first half-cylinder 14*a* and second half-cylinder 14*b* may be symmetrical to each other according to an axial plane of symmetry passing through the X axis and the Y axis. Thus, "end-to-end" should be understood to mean that the two half-cylinders, once assembled together, form a cylinder with a connection along the median plane of the cylinder, also an axial plane of symmetry. In addition, each half-cylinder comprises a semi-cylindrical surface and an opposite flat surface. The circumferentially end-to-end arrangement brings the flat surfaces of the two half-cylinders into contact.

First half-cylinder 14*a* and second half-cylinder 14*b* each respectively comprise a first half-cylinder flange 21*a* and a second half-cylinder flange 21*b*. First half-cylinder flange 21*a* and second half-cylinder flange 21*b* extend radially relative to first half-cylinder 14*a* and to second half-cylinder 14*b* respectively. In other words, first half-cylinder flange 21*a* and second half-cylinder flange 21*b* extend radially relative to the X axis. First half-cylinder flange 21*a* and second half-cylinder flange 21*b* respectively comprise a first attachment means 22*a* and a second attachment means 22*b*. The attachment means allow independently attaching each half-cylinder to fixed portion 15 of turbine engine 10. In particular and for example, the attachment means are a set of screws and nuts cooperating with half-cylinder flanges 21*a*, 21*b* as well as with the fixed portion of the turbine engine, the half-cylinder flanges not being attached to each other.

In addition, suspension assembly 11 comprises a support ring 23. Support ring 23 is provided to implement a safety function in the event of failure of at least one element of suspension assembly 11. Alternatively, suspension assembly 11 further comprises a retaining ring 24. Support ring 23 and retaining ring 24 are described with reference to the alternative embodiments shown in FIGS. 2A, 2B, 3A, 3B, 4A and 4B.

Figures 2A, 2B:
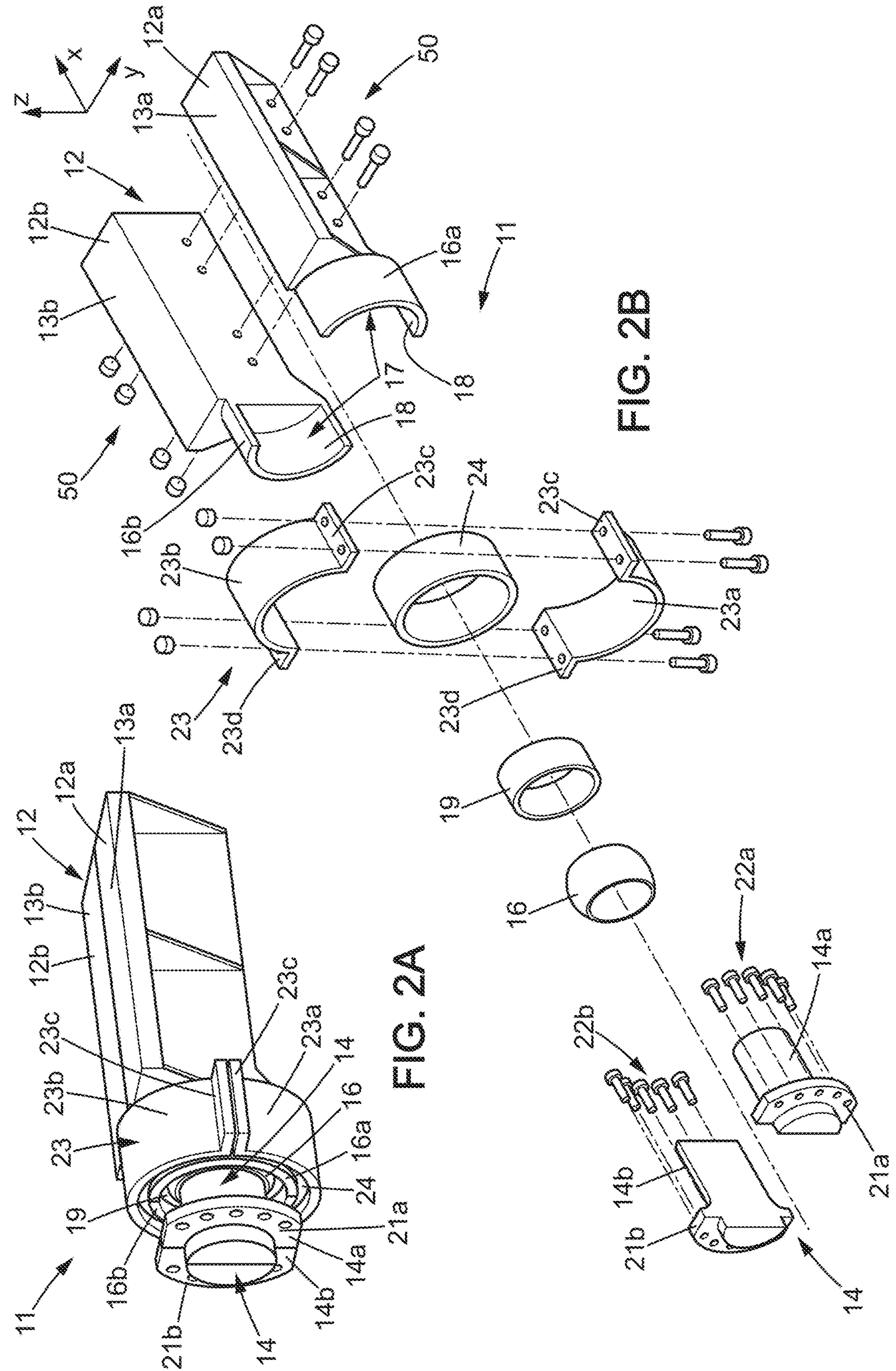
FIG. 2A is a perspective view of a suspension assembly according to a first exemplary embodiment.
FIG. 2B is an exploded perspective view of the assembly of FIG. 2A.

As illustrated in FIGS. 2A and 2B, suspension assembly 11 comprises support ring 23 and retaining ring 24. Retaining ring 24 is provided to keep the two half-housings 16*a*, 16*b* in contact with each other in the event of breakage of beam 12. In other words, it makes it possible to consolidate the assembly of the two beam portions into the region of the two half-housings. For example, in the absence of the retaining ring, if breakage occurs in part 12*a* or 12*b* of beam 12 resulting in the loss of the connection of this part to the pylon, first portion 12*a* and second portion 12*b*, and in particular the two half-housings 16*a*, 16*b*, may move apart from each other so that ball joint housing 17 opens up. There is therefore a loss of integrity of ball joint housing 17 and the latter no longer performs its function of receiving ball joint nut 16. Ball joint nut 16 is thus no longer hingedly engaged to rotate with ball joint housing 17, and cylindrical part 19 thus loses its connection with the pylon. Turbine engine is consequently no longer connected to the pylon. There is thus a loss of transmission of forces between the turbine engine and the pylon. Retaining ring 24 is arranged on the 10 outer circumference of ball joint housing 17. In other words, retaining ring 24 surrounds ball joint housing 17. Retaining ring 24 is further configured to be able to resist, i.e. not break under, a load up to a limit level beyond which retaining ring 24 would undergo permanent deformation. Retaining ring 24 therefore has a load bearing function in the event of failure of a portion of beam 12, this faulty portion no longer fulfilling its force-transmission function.

More precisely, during normal operation of suspension assembly 11, i.e. without failure, retaining ring 24 stands ready to bear a certain amount of load. It is when a failure appears at beam 12 that retaining ring 24 takes up at least part of the load. Retaining ring 24 is configured to fulfill its load bearing function at least until the next mechanical inspection of suspension assembly 11. The retaining ring thus makes it possible to avoid a sudden break in the connection between the turbine engine and the pylon, sustaining a sufficient level of load until the next inspection of the aircraft. In addition, retaining ring 24 may be annular or ring-shaped. Advantageously, its inner surface is complementary to the outer surface of the ball joint housing, and the outer surface of the retaining ring may be of a shape complementary to the inner surface of support ring 23.

Suspension assembly 11 of FIGS. 2A and 2B further comprises support ring 23. Support ring 23 comprises two ring portions 23*a*, 23*b*. The two ring portions 23*a*, 23*b* are symmetrical to each other according to an axial plane extending in the directions of the X and Y axes, the axial plane being perpendicular to the radial plane of the turbine engine. As can be seen for example in FIG. 2B, the plane of symmetry of the two ring portions 23*a*, 23*b* is perpendicular to the plane of symmetry of the two beam portions 12*a*, 12*b*. The two ring portions 23*a*, 23*b* rest against each other via ring flanges 23*c*, 23*d*. Ring flanges 23*c*, 23*d* are provided for attaching the two ring portions 23*a*, 23*b* to each other. Ring flanges 23*c*, 23*b* extend axially in the direction of the X axis. Support ring 23 is arranged on the outer circumference of retaining ring 24. Support ring 23 provides additional security to suspension assembly 11, in the event of a failure appearing in particular at ball joint housing 17. Support ring 23 in fact provides reinforcement around retaining ring 24, to bear the load in the event that retaining ring 24 fails. Support ring 23 may thus be described as a secondary load-bearing ring while retaining ring 24 may be described as a primary load-bearing ring.

Figures 3A, 3B:
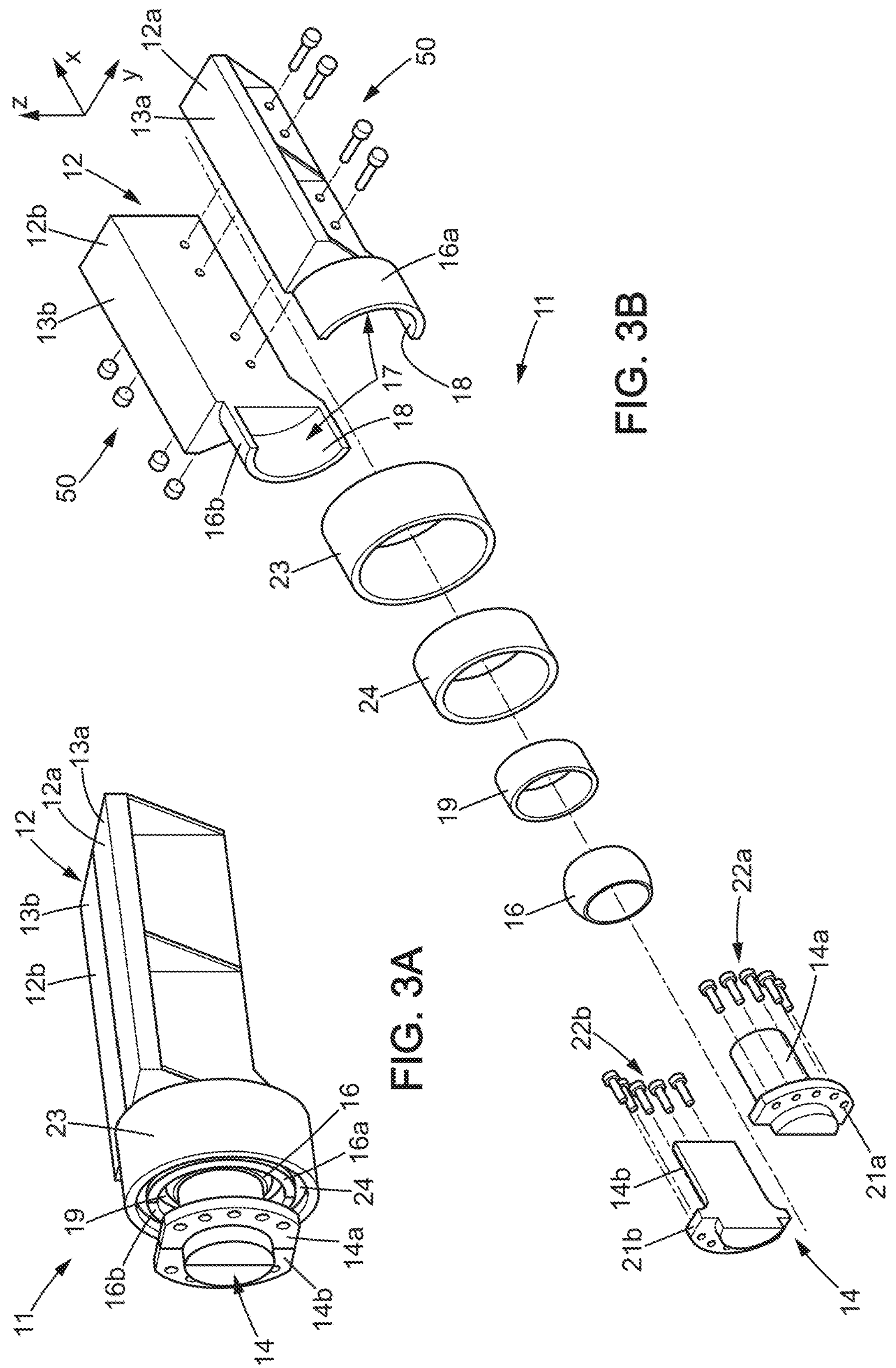
FIG. 3A is a perspective view of a suspension assembly according to a second exemplary embodiment.
FIG. 3B is an exploded perspective view of the assembly of FIG. 3A.

FIGS. 3A and 3B illustrate another exemplary embodiment of suspension assembly 11. This example is identical to the example described above with reference to FIGS. 2A and 2B, except that support ring 23 is a single piece. This configuration has the advantage of being more compact than the previous example, since there are no flanges and fasteners.

Figures 4A, 4B:
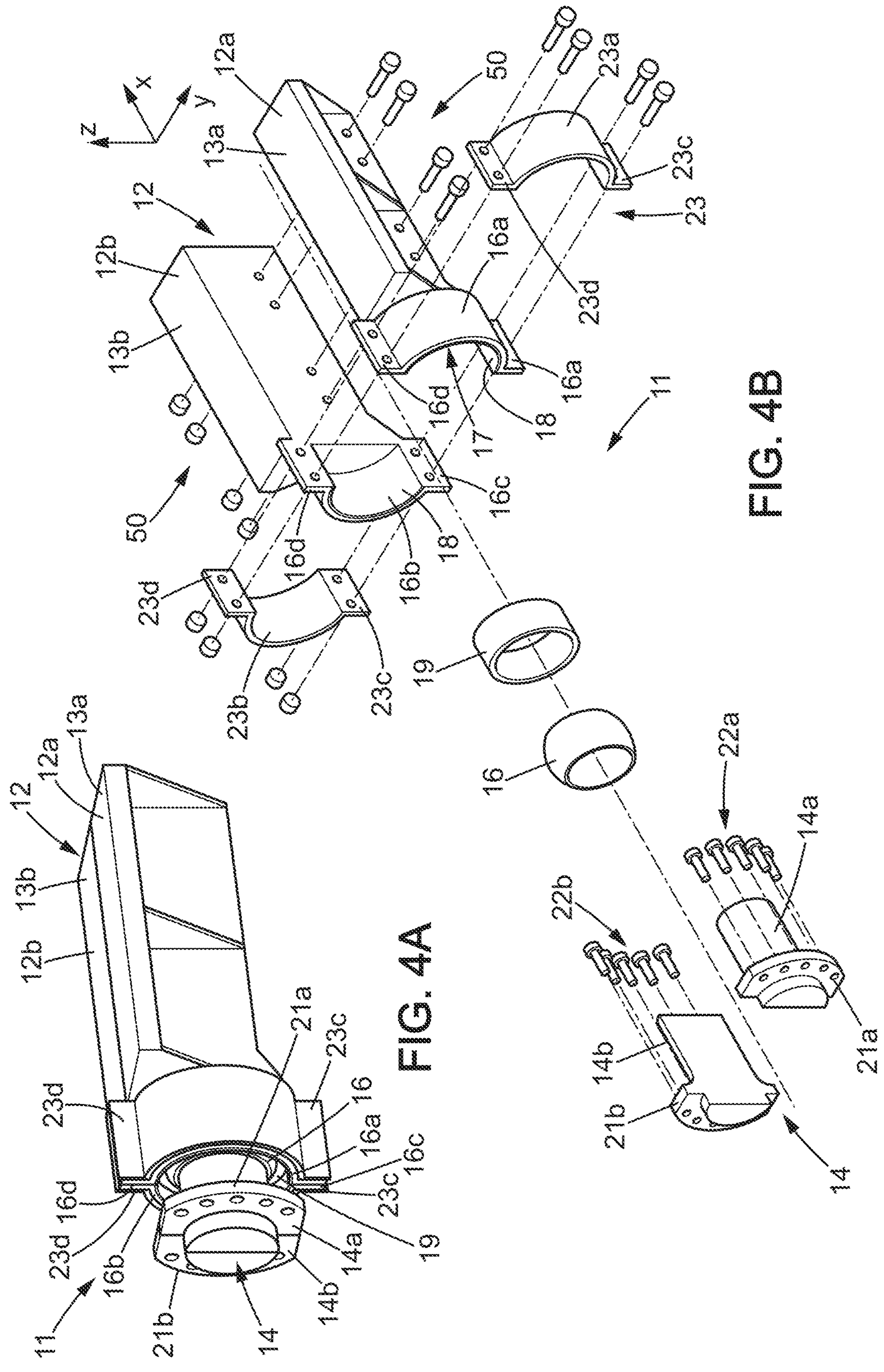
FIG. 4A is a perspective view of a suspension assembly according to a third exemplary embodiment.
FIG. 4B is an exploded perspective view of the assembly of FIG. 4A.

FIGS. 4A and 4B illustrate yet another exemplary embodiment of suspension assembly 11. In this example, unlike the two examples described above, the suspension assembly does not comprise a retaining ring 24. Support ring 23 is thus arranged on the outer circumference of ball joint housing 17. Support ring 23 also comprises two ring portions 23*a*, 23*b* and ring flanges 23*c*, 23*d*. In this example, the two ring portions 23*a*, 23*b* are symmetrical to each other according to a radial plane extending in the directions of the X and Z axes, the radial plane being the same as the radial plane of the turbine engine. Furthermore, as can be seen for example in FIG. 4B, the plane of symmetry of the two ring portions 23*a*, 23*b* is the same as the plane of symmetry of the two beam portions 12*a*, 12*b*. Ring flanges 23*c*, 23*d* are arranged respectively radially internally and radially externally relative to the axis L of the turbine engine. Furthermore, each half-housing 16*a*, 16*b* comprises flanges, hereinafter referred to as ball joint housing flanges 16*c*, 16*d*. Ball joint housing flanges 16*c*, 16*d* are arranged radially internally and radially externally relative to the X axis. Ball joint housing flanges 16*c*, 16*d* and ring flanges 23*c*, 23*d* are arranged in the same planes and are provided for their joint attachment. In comparison with the example of FIGS. 2A and 2B, the two ring portions 23*a*, 23*b* do not bear against each other via ring flanges 23*c*, 23*d*. In contrast, in the example illustrated in FIGS. 4A and 4B, ring flanges 23*c*, 23*d* bear against ball joint housing flanges 16*c*, 16*d*, and the two half-housings 16*a*, 16*b* bear against each other via ball joint housing flanges 16*c*, 16*d*. More specifically, ring flanges 23*c*, 23*d* enclose ball joint housing flanges 16*c*, 16*d*. In other words, ball joint housing flanges 16*c* are held between the two ring flanges 23*c*, and ball joint housing flanges 16*d* are held between the two ring flanges 23*d*. Fastening means, on the flanges, for example such as a set of screws and nuts, assemble together the two ball joint housing portions 16*a*, 16*b* and the two ring portions 23*a*, 23*b*. This configuration, and in particular the joint attachment of flanges 23*c*, 23*d*, 16*c*, 16*d*, has the advantage of keeping the two half-housings 16*a*, 16*b* in contact with each other in the event that beam 12 breaks. In the event of failure of one portion of the beam, the other portion, which retains its connection with the pylon, can then continue to transmit forces between the turbine engine and the pylon.

From the various examples detailed above, it is therefore understood that the suspension assembly is designed to maintain its function of connection and force transmission from the turbine engine to the pylon, even in the event of a failure of a component part. For this purpose, and for example:

- if a half-cylinder of cylindrical part 14 breaks, i.e. if there is a loss of connection between the half-cylinder and the turbine engine, then the other half-cylinder, which is not integral with the faulty half-cylinder, maintains the connection with the turbine engine,
- if a beam portion 12 breaks, i.e. if there is a loss of connection between the beam portion and the pylon, then the other beam portion maintains the connection with the pylon, and the support ring and the retaining ring, when there is such, maintain the connection with the ball joint nut by preserving the integrity of the ball joint housing.

The invention claimed is:

1. A suspension assembly for a turbine engine, comprising:

- a beam configured to be attached to an aircraft pylon, the beam comprising a first portion and a second portion each carrying a half-housing which together define a ball joint housing,
- a ball joint nut hingedly engaged to rotate in the ball joint housing,
- a cylindrical part configured to be attached to a fixed portion of the turbine engine, hinged in the ball joint housing, and mounted so as to be pivotable about an axis in the ball joint nut, and
- a support ring surrounding the two half-housings around an entire circumference, said support ring being provided to perform a safety function in an event of failure of at least one element of the suspension assembly.

2. The suspension assembly according to claim 1, wherein the beam extends axially and wherein the two portions of the beam and the two half-housings are symmetrical to each other with respect to a radial plane and are secured to each other by fastening elements arranged on the beam.

3. The suspension assembly according to claim 2, wherein the support ring comprises two ring portions which are symmetrical to each other and which bear against each other via ring flanges, said ring flanges being provided for fastening the two ring portions together.

4. The suspension assembly according to claim 3, wherein the two ring portions are symmetrical to each other according to the radial plane, the ring flanges being arranged radially internally and radially externally, and wherein each half-housing comprises ball joint housing flanges arranged radially internally and externally, the ring flanges and the ball joint housing flanges being provided for a joint attachment.

5. The suspension assembly according to claim 3, further comprising a retaining ring, wherein the ball joint housing is cylindrical and without fastening elements, the retaining ring being arranged on an outer circumference of the ball joint housing, and the support ring being arranged on an outer circumference of the retaining ring, the two ring portions of the support ring being symmetrical to each other according to an axial plane perpendicular to the radial plane, the ring flanges of the two ring portions extending axially in an axial direction.

6. The suspension assembly according to claim 1, further comprising a ball joint ring arranged against an inner circumference of the ball joint housing, the ball joint nut being arranged in the ball joint ring.

7. The suspension assembly according to claim 6, further comprising a vibration damper arranged radially between the ball joint ring and the inner circumference of the ball joint housing.

8. The suspension assembly according to claim 1, wherein the cylindrical part comprises a first half-cylinder and a second half-cylinder which are arranged end-to-end circumferentially, and wherein the first half-cylinder comprises a first half-cylinder flange extending radially to the first half-cylinder and the second half-cylinder comprises a second half-cylinder flange extending radially to the second half-cylinder, the first half-cylinder flange and the second half-cylinder flange respectively comprising a first attachment means and a second attachment means for the independent attachment of each half-cylinder to the fixed portion of the turbine engine.

9. Aircraft assembly comprising a pylon and a turbine engine, the turbine engine comprising a fixed portion, the aircraft assembly further comprising the suspension assembly according to claim 1.

* * * * *